March 22, 1966    M. W. WATTS    3,241,501
HOLD-DOWN DEVICE
Filed Jan. 8, 1964    2 Sheets-Sheet 1

INVENTOR.
Max Welton Watts
BY
Newton, Hopkins & Jones
ATTORNEYS

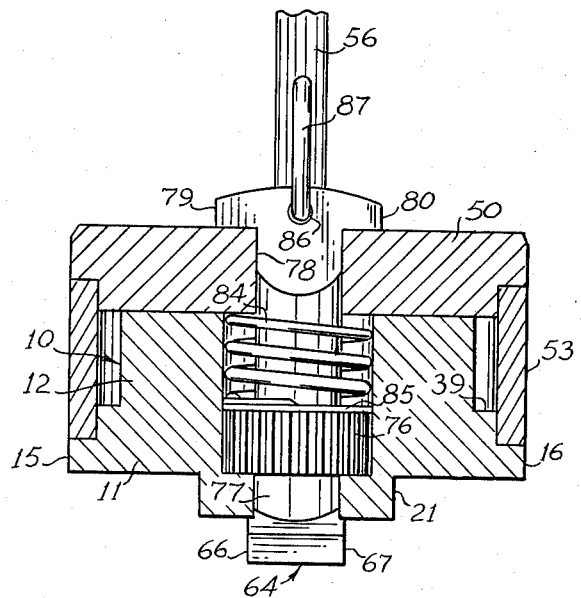
Fig. 3
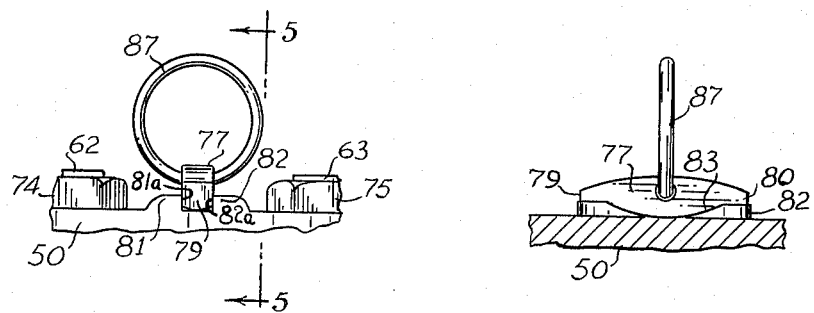
Fig. 4
Fig. 5
INVENTOR.
Max Welton Watts

United States Patent Office 3,241,501
Patented Mar. 22, 1966

3,241,501
HOLD-DOWN DEVICE
Max Welton Watts, Clayton, Ga., assignor to The Aid Corporation, Clayton, Ga., a corporation of Georgia
Filed Jan. 8, 1964, Ser. No. 336,578
9 Claims. (Cl. 105—369)

This invention relates to a hold-down device and is more particularly concerned with a device for releasably securing an object, for example a line, rope, hook or cable to a structural member.

In the past, cargo type airplanes have been provided with structural members along the deck of the airplane, the structural members being adapted to receive hold-down devices when desired. Such hold-down devices are employed when cargo is strapped in place on the deck of the airplane so as to provide a ring or rung to which hooks, chains, rope, cable, and the like may be readily attached. The prior art hold-down devices, however, have been so constructed that they are not capable of carrying a great load without giving way and, therefore, a need has arisen to provide a hold-down device which is relatively strong and will not readily give way upon the application of force outwardly or sidewise of the hold-down device.

Briefly, the present hold-down device includes a housing within which are mounted a pair of spaced, parallel, rotatable latch shafts each being provided at its end with a quick release, quarter turn, latch mechanism. Within the housing, the two latch shafts are provided with opposed, spaced, pinions which mesh, on opposite sides, with a common control pinion mounted on a central pin. The outer end of the central pin is provided with a widened head adapted to fit into grooves in the locking ring of the housing for maintaining the latch mechanism in a locked position. The head is provided with a ring by which the pin may be lifted for rotation into a locked or unlocked position. The shaft is spring loaded, however, so as to urge the head into engagement with the locking ring. Surrounding the housing of the hold-down device is a collar, into which the trunnions of a bail project. The collar is freely rotatable about the body of the hold-down device while the bail extends outwardly therefrom for the receipt of a hook, line, cable or other device for securing an object in place. In addition to the latch mechanism, a plurality of spaced blocks protrude below the lower surface of the housing and are adapted to be received in conforming recesses in the structural member for preventing lateral movement of the hold-down device.

Accordingly, it is an object of the present invention to provide a hold-down device which is inexpensive to manufacture, durable in structure, and efficient in operation.

Another object of the present invention is to provide a hold-down device which may be readily and quickly released and which, when in place, will withstand forces exerted on the hold-down device from substantially any direction.

Another object of the present invention is to provide a hold-down device which can be readily and easily installed in or removed from any of a variety of prescribed positions along a structural member and which will indicate visually and by feel when the device is locked in position.

Another object of the present invention is to provide a hold-down device which may be locked or unlocked from its position by the rotation of a single pin through a quarter turn.

Another object of the present invention is to provide a hold-device which cannot be readily positioned in a partially locked or partially unlocked condition.

Other objects, features and advantages of the present invention will become apparent from the following description when taken in conjunction with the accompanying drawings wherein like characters of reference designate corresponding parts throughout the several views and wherein:

FIG. 3 is a vertical sectional view taken substantially along line 3—3 in FIG. 2.

FIG. 4 is a fragmentary vertical elevational view of a portion of the hold-down device illustrated in FIG. 1.

FIG. 5 is a vertical sectional view taken substantially along line 5—5 in FIG. 4.

Figure 1:
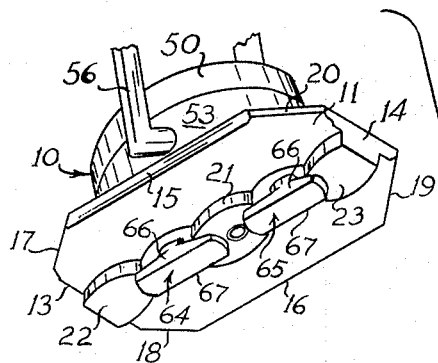
FIG. 1 is a perspective view of a structural member and the hold-down device of the present invention, the hold-down device being in a position to be received by the structural member.

Referring now in detail to the embodiment chosen for the purpose of illustrating the present invention, it being understood that in its broader aspects, the present invention is not limited to the exact details herein depicted, numeral 10 denotes generally the body of the hold-down device of the present invention. The body 10 includes at its bottom portion a flat elongated hexagonal base 11 and a cylindrical shank 12 mounted centrally on the upper surface of the base 11. The base 11 includes a pair of opposed ends 13 and 14 which protrude beyond the opposite edge of the shank 12 and a pair of opposed sides 15 and 16. The corners 17, 18, 19 and 20 extend diagonally of base 11 and join the ends 13 and 14 respectively with the sides 15 and 16. It will be understood that the ends 13 and 14 are parallel to each other and that the sides 15 and 16 are, likewise, parallel to each other but perpendicular to the ends 13 and 14. The corners 17, 18, 19 and 20 are disposed at approximately 45 degrees with respect to both the ends 13 and 14 and the sides 15 and 16. The lower surface of base 10 is essentially flat except that there protrudes in longitudinal alignment, three cylindrically shaped, equally spaced, blocks 21, 22 and 23. The purpose of the blocks 21, 22 and 23 is to prevent lateral or sidewise movement of the hold-down device when received in correspondingly spaced, circular openings or holes 30, 31 and 32 of a structural member 33.

The structural member 33 also includes a wide inner groove or channel 34 which is common to and extends beneath all aligned openings 30, 31, 32, etc. Channel 34 communicates with holes 30, 31, 32 but is substantially wider than the diameter thereof. Outwardly of groove 34, the structural member 33 is provided with slots between adjacent holes, such as slots 35 and 36 which connect the holes 30, 31 and 32 together, the slots, such as slots 35 and 36, being of less width than the diameter of the holes 30, 31 and 32 and being of less width than and in communication with the channel 34.

Referring back to the body 11, it will be seen that the shank 12 secured to the upper surface of body 11 is concentric with, but of larger diameter than the central block 21, there being a lower centrol hole 37 in the block 21 communicating with an upper counterbored, larger diameter, hole 38 in the shank 12. The shank 12 is also provided with a circumferential shoulder 39 at its lower end. The structure of body 10, thus far described, is integral, being machined from a single piece of bronze or other light weight alloy.

Between the central block 21 and the outer blocks 22 and 23 are a pair of pinion receiving cavities 40 and 41 which are spaced equally on opposite sides of the central hole 37. The cavities 40 and 41 which are cylindrical are of larger diameter than the space between the blocks 21 and 22 and 23 and therefore cuts equally in portions of each block on each side, the cavities 40 and 41 extending through the base 11 and into the circumferential shoulder 39 of the shank 12. These cavities 40 and 41 are provided with counter bores 42 and 43 of a smaller diameter, the counter bores 42 and 43 extending along opposite sides of the hole 38. The cavities 40 and 41 are of sufficient diameter that they intersect the lower portion of the central counter bore 38 in the region of the upper surface of base 11 so as to provide communication between the respective cavities 40 and 41 and the counter bore 38.

Received on top of the shank 12 is a cylindrical or disc shaped cap 50, the lower peripheral portion of which is provided with a peripheral groove 51, the peripheral groove defining a shoulder 52 which is spaced from and of the same diameter with the shoulder 39. A freely rotatable collar 53 is received by the shoulders 39 and 52, the downward movement of the cylindrical collar 53 being limited by the upper surface of the base 11 and the upward movement of the collar 53 being limited by the cap 50.

The collar 53 is provided with a pair of diametrically opposed holes which respectively receive the trunnions 54 and 55 of a U-shaped bail 56, the bail 56 being so dimensioned as to extend freely over the cap 50 so as to be adapted to rotate through an arc of at least approximately 180 degrees about the horizontal axis of the aligned trunnions 54 and 55. Since the collar 53 is itself freely rotatable about the vertical axis of body 10, the bail 56 is, likewise, rotatable about the vertical axis of the hold-down device. The inner ends of the trunnions 55 and 56 protrude inwardly beyond the inner surface of the collar 53 and terminate in the space between the collar 53 and the shank 12, being equally spaced between the upper surface of the shoulder 39 and the lower surface of the shoulder 52. It is now seen that the bail 56 is freely pivotal about a horizontal axis defined by the trunnions 54 and 55 and is also freely rotatable about the vertical axis of the hold-down device.

The cap 50 is provided with a pair of outwardly opening, cylindrical, nut receiving, recesses 57 and 58 in coaxial alignment with the recesses 40 and 41, the recesses 57 and 58 being counterbored to provide bores 60 and 61 in alignment respectively with and of the same diameter as the bores 42 and 43.

The bores 42, 43, 60 and 61 thus form a pair of parallel journals which receive from the bottom, the spaced parallel locking shafts 62 and 63. The locking shafts 62 and 63 are respectively provided at their lower ends with radially extending latch bars 64 and 65. The latch bars 64 and 65 are each of identical construction and include a pair of parallel sides 66 and 67 defining a width, for the locking bars of less than the width of the slots 35 or 36. The length of each locking bar 64 or 65 is less than the width of the groove 34 but greater than the width of the slot 35 or 36.

The upper surfaces 100, 101, of the locking bars 64 and 65 taper upwardly to conform to the upwardly tapered bottom surfaces of the opposed inwardly extending flange portions 90, 91 between slots 35 and 36 and above groove 34. Above the locking bars 64 and 65 the shafts 62 and 63 are provided with necks 68 and 69 which are of a larger diameter than the diameter of the remaining portions of shafts 62 and 63 and therefore provide shoulders on which are received nylon washers 70 and 71. Above the nylon washers 70 and 71 are respectively the pinions 72 and 73 which are fixed to and rotatable with the shafts 62 and 63. The pinions 72 and 73 are received in cavities 40 and 41 respectively and therefore prevent upward movement of the shafts 62 and 63.

The shafts 62 and 63 are provided with external threads at their upper ends and threadedly receive nuts 74 and 75 within the nut receiving recesses 57 and 58. The nuts 74 and 75 prevent downward movement of the shafts 62 and 63. Furthermore, the nuts 74 and 75 prevent the cap 50 from being removed from the body 10.

As best seen FIG. 2, the necks 68 and 69 space the locking bars 64 and 65 below the lower surfaces of the blocks 21, 22 and 23 by distances sufficient that when the base 11 is resting flat upon the upper surface of the structural member 33 and the blocks 21, 22 and 23 are received in the holes 30, 31 and 32, the transverse bars 64 and 65 project into the groove 34.

For rotating the pinions 72 and 73 simultaneously in the same direction, a central drive pinion 76 is provided in the bottom portion of hole 38 so as to mesh on opposite sides with the pinions 72 and 73 respectively. An upright locking pin or control pin 77 receives the control pinion 76 and projects therebelow into the central hole 37. The upper portion of pin 77 projects through the hole 58 and is journalled by a central hole 78 in the cap 50 between the recesses 57 and 58. The pin 77 projects outwardly beyond the outer surface of the cap 50 and is provided with a pair of diametrically opposed radially extending wings 79 and 80. The wings 79 and 80 have a rounded bottom surface such as illustrated for wing 79 in FIG. 4. The wings 79 and 80 have parallel upright sides so as to be removably received in diametrically opposed recesses defined by the opposed upright sides of flanges 81 and 82 on the top surface of cap 50, when the pin 77 is positioned for locking the hold-down device, i.e., when the locking bars 64 and 65 are disposed transversely of the groove 34.

In more detail, the flanges 81 and 82 are disposed on opposite sides of a transverse centerline of the cap 50 and each flange 81 or 82 includes a central concaved portion 83, seen in FIG. 5. The flanges terminate in the shoulders 81a and 82a which are disposed parallel to each other on opposite sides of the transverse centerline so that when the pin 77 is rotated, the wings 79 and 80 may be selectively positioned in the recess between the shoulders 81a and 82a or, when the pin is rotated 90 degrees therefrom, positioned in the concaved portions, such as concave portion 83. When the wings 79 and 80 are positioned in the concaved portions, such as portion 83, the locking device is in its unlocked position since the locking bars 64 and 65 are aligned with each other.

Figure 2:
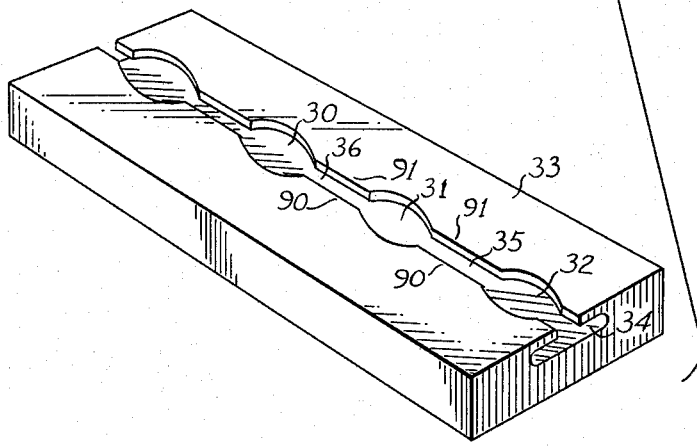
FIG. 2 is a fragmentary vertical sectional view of the hold-down device illustrated in FIG. 1.
Figure 2:
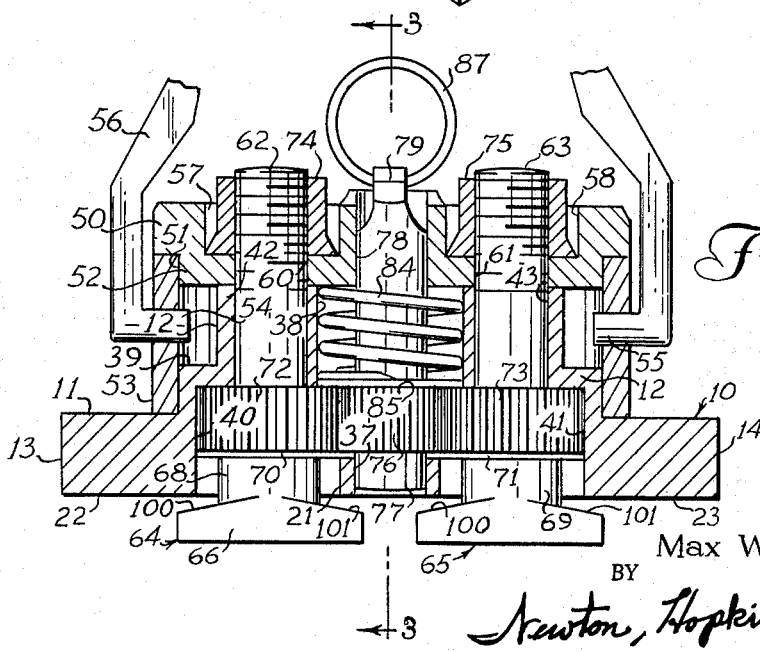

As best seen in FIGS. 2 and 3, a helical spring 84 surrounds the pin 77 within the hole 38. One end of the spring 84 acts against a keeper ring 85 mounted on the top of the control pinion 76 and the other end of spring 84 acts against the lower surface of the cap 50. Thus, at all times, the pinion 76 and hence pin 77 is urged downwardly so as to bring the control pinion 76 into transverse alignment, generally, with the pinions 72 and 73. The pinions 72, 73 and 76 are sufficiently thick that, regardless of the axial position of pinion 76 within hole 38, the pinions 72 and 73 and 76 are intermeshed. Furthermore, the pin 77 is of such a length that the wings 79 and 80 are at all times, urged against the flanges 81 and 82, or into the recesses between the flanges 81 and 82.

Between the wings 79 and 80, the pin 77 is provided with a central hole 86 which receives a control ring 87 therein. The ring 87 is of sufficient size that it may be held between the thumb and forefinger of a person and, thus, may be rotated to rotate the pin 77.

Operation

From the foregoing description the operation of the present device should be apparent. The pinions 72 and 73 mesh, at all times, with the central control pinion 76; however, the pin 77 may be raised or lowered sufficiently that the wings 79 and 80 clear the upper surface of the flanges 81 and 82 to permit free rotation of the pin 77, thereby permitting the control pinion 76 to rotate the pinions 72 and 73 in the same direction as the central pin 77 is rotated.

In the first or unlocked position, as illustrated in FIG. 1, the locking bars 64 and 65 are aligned transversely with each other. With the locking bars 64 and 65 so aligned, the hold-down device may be placed upon the upper surface of the structural member 33 so that the locking bars 64 and 65 project respectively through the slots 36 and 35 as the blocks 21, 22 and 23 project respectively into the holes 31, 30 and 32 of the structural member. When the locking device is properly positioned, the lower surface of base 11 rests upon the upper surface of the structural member 33 so that the locking bars 64 and 65 project into the area defined by the groove 34. Thereafter, the pin 77 is lifted and rotated 90 degrees, in either direction, as the body 10 is held in place. Indeed, the ring 87 need only be rotated 90 degrees, without any lifting of the pin since the concaved portions 83 of the flanges 81 and 82 act as camming surfaces which lift wings 79 and 80 as it is rotated so that the wings 79 and 80 drop into the recesses between the flanges 81 and 82. Since the pinions 76, 72 and 73 have equal numbers of teeth, the rotation of the shaft 77 through 90 degrees, likewise rotates the shafts 62 and 63 through 90 degrees so as to dispose the locking bars 64 and 65 in their second or locked positions which are transversely with respect to the groove 34. Since the length of the locking bars 64 and 65 exceeds the width of the slots 36 and 35, the flanges 90 and 91 will prevent outward movement of the hold-down device from member 33. Furthermore, the blocks 21, 22 and 23, being received in their holes 31, 30 and 32, prevent the hold-down device from being moved along the groove 34 or laterally thereof.

It will be understood that when it is desired to remove the hold-down device, the pin 77 is lifted by the ring 87 sufficiently for the wings 79 and 80 to clear the flanges 81 and 82 and then rotated 90 degrees in either direction so as to position the wings 79 and 80 within the recessed portions, such as portion 83, of the flanges 81 and 82. This again aligns the locking bars 64 and 65 with their slots 36 and 35 and the hold-down device may, thereafter, be removed from the structural member 33.

When the hold-down device is in its locked position, the bail 56 is freely accessible and may receive a hook (not shown) or other like member therein so as to prevent movement of such hook or like member. Nevertheless, the bail 56 is freely rotatable about both a horizontal and a vertical axis so that it may be positioned, leaning in substantially any direction.

It will be obvious to those skilled in the art that many variations may be made in the embodiment here chosen for the purpose of illustrating the present invention without departing from the scope thereof as defined by the appended claims.

I claim:

1. In a hold-down device, a body, a control pin projecting through said body, a control pinion carried by said control pin for rotation therewith, follower pinions meshing with said control pinion for simultaneous rotation by said control pinion, and spaced locking means protruding from said body and connected to said follower pinions for simultaneous rotation from first positions with respect to said device to second positions with respect to said device upon simultaneous rotation of said follower pinions.

2. In a hold-down device, a body having a base and a shank, a cap for said shank, means for securing said cap to said shank, a control pin projecting through said cap and said body, a control pinion carried by said control pin for rotation therewith and disposed within said body, follower pinions meshing with said control pinion on opposite sides thereof for simultaneous rotation by said control pinion, spaced locking means protruding from said base and connected to said follower pinions for simultaneous rotation from positions longitudinally disposed with respect to said device to positions transversely disposed with respect to said device upon simultaneous rotation of said follower pinions, and means on said cap for locking said control pin in a prescribed radial position such that said locking means are disposed in their said transversely disposed positions.

3. A hold-down device comprising a body having a base and a shank, a cap for said shank, a collar surrounding said shank and confined between said cap and said base, a central control pin projecting through said cap and said body, a bail having trunnions protruding from opposite sides through and journalled by said collar, a control pinion carried by said control pin for rotation therewith and disposed within said body, follower pinions meshing with said control pinion for simultaneous rotation by said control pinion, spaced locking means protruding from said base and connected to said follower pinions for simultaneous rotation from first positions with respect to said device to second positions with respect to said device upon simultaneous rotation of said follower pinions, and means for locking said control pin in a prescribed radial position such that said locking means are disposed in their second positions.

4. A hold-down device comprising a body having a base and a shank, a cap for said shank, a collar surrounding said shank and confined between said cap and said base, a central control pin projecting through said cap and said body, a bail having trunnions protruding from opposite sides through and journalled by said collar, a control pinion carried by said control pin for rotation therewith and disposed within said body, follower pinions meshing with said control pinion for simultaneous rotation by said control pinion, spaced locking means protruding from said base and connected to said follower pinions for simultaneous rotation from first positions to second positions upon simultaneous rotation of said follower pinions, means for locking said control pin in a prescribed radial position such that said locking means are disposed in their second positions and spaced blocks protruding from said base.

5. A hold-down device comprising a body having a base and a shank, a cap for said shank, a collar surrounding said shank and confined between said cap and said base, a central control pin projecting through said cap and said body, a bail having trunnions protruding from opposite sides through and journalled by said collar, a control pinion carried by said control pin for rotation therewith and disposed within said body, follower pinions meshing with said control pinion for simultaneous rotation by said control pinion, a pair of shafts on opposite sides of said control shaft journalled by said body and said cap, nuts on the ends of said shafts engaging said cap for securing said cap to said shank and for retaining said shafts in said body, said shafts being rotatable by said follower pinions, said shafts protruding from said base, and locking bars on the ends of said shafts for simultaneous rotation from first positions to second positions upon simultaneous rotation of said follower pinions, and locking flanges on said cap for locking said pin in a prescribed radial position such that said locking bars are disposed in their second positions.

6. A hold-down device for cooperating with a structural member of the type having a flat upper surface and aligned equally spaced holes through said upper surface, said structural member also having aligned slots connecting said holes and a subsurface groove common to and extending beneath said slots and said holes, said hold-down device comprising a body provided with a bottom surface for abutting the upper surface of said structural member, blocks protruding from said bottom surface of said body, said block having a transverse dimension greater than the width of said slots and less than the width of said holes, a control pin disposed within said body, a control pinion carried by said control pin within said body, a pair of parallel locking pins carried by said body on opposite sides of said control pin, pinions on said locking pins meshing with said control pinion for rotation thereby, said locking shafts protruding below said bottom surface, and locking bars extending radially from the ends of said locking shafts, said locking bars having a width less than the width of said slots and a length less than the width of said groove and greater than the width of said slots.

7. In a hold-down device for cooperating with a structural member of the type having a flat upper surface and aligned equally spaced holes through said upper surface, said structural member also having aligned slots connecting said holes and a subsurface groove common to and extending beneath said slots and said holes, said hold-down device comprising a body provided with a flat bottom surface for abutting the upper surface of said structural member, a plurality of aligned blocks protruding from said bottom surface of said body, said blocks being spaced apart by a distance approximately equal to the spacing of said holes apart, a control pin disposed within said body, a control pinion carried by said control pin within said body, a pair of parallel locking pins carried by said body on opposite sides of said control pin, pinions on said locking pins meshing with said control pinion for rotation thereby, said locking shafts protruding below said bottom surface between said blocks, and locking bars extending radially from the ends of said locking shafts, said locking bars having a width less than the width of said slots and a length less than the width of said groove and greater than the width of said slots, said locking bars being spaced below said bottom surface sufficiently to be received wholly within the confines of said subsurface groove when said bottom surface of said locking device is resting upon said upper surface of structural member.

8. A hold-down device for cooperating with a structural member of the type having a flat upper surface and aligned equally spaced circular holes through said upper surface, said structural member also having aligned slots connecting said holes and a subsurface groove common to and extending beneath said slots and said holes, said hold-down device comprising a body provided with a flat bottom surface for abutting the upper surface of said structural member, a plurality of aligned circular blocks protruding from said bottom surface of said body, said blocks being of a diameter greater than the width of said slots and less than the diameter of said holes, said blocks being spaced apart by a distance approximately equal to the spacing of said holes apart, a control pin disposed axially within said body, a control pinion carried by said control pin within said body, a pair of parallel locking pins carried by said body on opposite sides of said control pin, pinions on said locking pins meshing with said control pinion for rotation thereby, said locking shafts protruding below said bottom surface between said blocks, locking bars extending radially from the ends of said locking shafts, said locking bars having a width less than the width of said slots and a length less than the width of said groove and greater than the width of said slots, said locking bars being spaced below said bottom surface sufficiently to be received wholly within the confines of said subsurface groove when said bottom surface of said locking device is resting upon said upper surface of structural member, said control pin protruding outwardly beyond the upper surface of said body, wings protruding radially from the upper end of said control pin, said body being provided with outwardly opening rcesses for receiving said wings when said control pin is positioned in a prescribed position such that said locking bars are disposed transversely of the line of alignment of said blocks, spring means yieldably urging said control pin inwardly of said body for urging said wings into said recesses.

9. A hold-down device for cooperating with a structural member of the type having a flat upper surface and aligned equally spaced circular holes through said upper surface, said structural member also having aligned slots connecting said holes and a subsurface groove common to and extending beneath said slots and said holes, said hold-down device comprising a body provided with a flat bottom surface for abutting the upper surface of said structural member, a plurality of aligned circular blocks protruding from said bottom surface of said body, said blocks being of a diameter greater than the width of said slots and less than the diameter of said holes, said blocks being spaced apart by a distance approximately equal to the spacing of said holes apart, a control pin disposed axially within said body, a control pinion carried by said control pin within said body, a pair of parallel locking pins carried by said body on opposite sides of said control pin, pinions on said locking pins meshing with said control pinion for rotation thereby, said locking shafts protruding below said bottom surface between said blocks, locking bars extending radially from the ends of said locking shafts, said locking bars having a width less than the width of said slots and a length less than the width of said groove and greater than the width of said slots, said locking bars being spaced below said bottom surface sufficiently to be received wholly within the confines of said subsurface groove when said bottom surface of said locking device is resting upon said upper surface of structural member, a cap on said body, said control pin protruding outward beyond the upper surface of said cap, nuts on the ends of said shafts for securing said cap to said body, a collar disposed between said cap and said body, a bail carried by said collar, a wing protruding radially from the upper end of said control pin, upstanding flanges on said cap defining an outwardly opening recess for receiving said wing when said control pin is positioned in a prescribed position such that said locking bars are disposed transversely of the line of alignment of said blocks, spring means yieldably urging said control pin inwardly of said body for urging said wings into said recesses.

References Cited by the Examiner
UNITED STATES PATENTS

| | | | |
|---|---|---|---|
| 1,655,536 | 1/1928 | Dumm | 287—91 |
| 2,047,503 | 7/1936 | Wilson et al. | 105—369 |
| 2,688,504 | 9/1954 | Parker | 248—361 X |
| 2,891,490 | 6/1959 | Elsner | 105—369 |

ARTHUR L. LA POINT, *Primary Examiner.*